US012044537B2

(12) United States Patent
Trangbaek et al.

(10) Patent No.: US 12,044,537 B2
(45) Date of Patent: Jul. 23, 2024

(54) METHOD AND SYSTEM FOR CLOUD-BASED ELECTRIFIED VEHICLE ENERGY USAGE SYSTEM

(71) Applicant: GM GLOBAL TECHNOLOGY OPERATIONS LLC, Detroit, MI (US)

(72) Inventors: Klaus Trangbaek, Ein Vered (IL); Daniel Urieli, Herzliya (IL); Vladimir Suplin, Modiin (IL); Jeremie Benichou, Binyamina (IL)

(73) Assignee: GM Global Technology Operations LLC, Detroit, MI (US)

( * ) Notice: Subject to any disclaimer, the term of this patent is extended or adjusted under 35 U.S.C. 154(b) by 90 days.

(21) Appl. No.: 17/884,873

(22) Filed: Aug. 10, 2022

(65) Prior Publication Data

US 2024/0053157 A1 Feb. 15, 2024

(51) Int. Cl.
*G01C 21/34* (2006.01)

(52) U.S. Cl.
CPC ..... *G01C 21/3469* (2013.01); *G01C 21/3461* (2013.01); *G01C 21/3492* (2013.01)

(58) Field of Classification Search
CPC .................................................. G01C 21/3469
See application file for complete search history.

(56) References Cited

U.S. PATENT DOCUMENTS

2015/0276420 A1* 10/2015 McGee .................. B60K 35/00 701/123
2016/0025508 A1* 1/2016 Meyer ................ G01C 21/3469 701/410
2018/0195870 A1* 7/2018 Miller .................... G07C 5/008
2020/0089241 A1* 3/2020 Kao ..................... G05D 1/0217
2020/0393259 A1* 12/2020 Gantt, Jr. ................ B60L 53/65
2021/0063181 A1* 3/2021 Saleh ................. G01C 21/3446
2022/0176939 A1* 6/2022 Poll ....................... B60W 10/26

* cited by examiner

*Primary Examiner* — Long T Tran
(74) *Attorney, Agent, or Firm* — Quinn IP Law

(57) ABSTRACT

The concepts described herein relate to methods, systems, and analytical techniques to achieve a cloud-based electrified vehicle energy usage system that includes a cloud-based server that is operative to receive vehicle-specific electric energy-related data from a plurality of connected electrified vehicles, and correlate the vehicle-specific electric energy-related data to a road segment. A data analysis is executed for the vehicle-specific electric energy-related data for the plurality of connected electrified vehicles for the road segment, and a crowd-sourced electrified vehicle energy usage report is generated for the road segment based upon the data analysis.

20 Claims, 4 Drawing Sheets

METHOD AND SYSTEM FOR CLOUD-BASED ELECTRIFIED VEHICLE ENERGY USAGE SYSTEM

INTRODUCTION

Electrified vehicles traverse segments of roadways, and may benefit from systems and methods that generate and provide aggregated data from multiple vehicles providing multiple measurements along the road segment, and multiple trips with the same vehicle providing multiple measurements along the road segment.

SUMMARY

The concepts described herein relate to methods, systems, and analytical techniques to achieve a cloud-based electrified vehicle energy usage system.

An aspect of the disclosure includes electrified vehicle energy usage system that includes a cloud-based server that is operative to receive vehicle-specific electric energy-related data from a plurality of connected electrified vehicles; correlate the vehicle-specific electric energy-related data to a road segment; execute a data analysis of the vehicle-specific electric energy-related data for the plurality of connected electrified vehicles for the road segment; and generate a crowd-sourced electrified vehicle energy usage report for the road segment based upon the data analysis.

Another aspect of the disclosure may include the cloud-based server operative to receive the vehicle-specific electric energy-related data from the plurality of the connected electrified vehicles, including receiving data related to vehicle operation, vehicle electric power consumption, and ambient conditions from the plurality of the connected electrified vehicles.

Another aspect of the disclosure may include the data related to vehicle operation being vehicle-specific factors affecting electric power consumption for tractive effort including vehicle speed and vehicle weight.

Another aspect of the disclosure may include the data related to vehicle electric power consumption being data related to electric power consumption for tractive effort that is expended while traversing the travel route portion.

Another aspect of the disclosure may include the data related to vehicle electric power consumption being data related to vehicle accessory loads that consume electric power, including heating, ventilation, and exterior lighting for the road segment.

Another aspect of the disclosure may include the data related to ambient conditions being ambient temperature, time of day, day of week, solar load, wind speed, wind direction, and road surface conditions for the road segment.

Another aspect of the disclosure may include the cloud-based server operative to execute the data analysis of the vehicle-specific electric energy-related data for the plurality of connected electrified vehicles for the road segment by determining statistical data for the vehicle-specific electric energy-related data for the plurality of connected electrified vehicles for the road segment.

Another aspect of the disclosure may include the cloud-based server operative to: receive, from a plurality of the connected electrified vehicles, vehicle-specific electric energy-related data for a plurality of road segments; execute a data analysis of the vehicle-specific electric energy-related data for the plurality of connected electrified vehicles for the plurality of road segments; and generate the crowd-sourced electrified vehicle energy usage report based upon the data analysis for the plurality of road segments.

Another aspect of the disclosure may include the cloud-based server operative to receive, from a plurality of the connected electrified vehicles, the vehicle-specific electric energy-related data for the plurality of road segments by receiving, from the plurality of the connected electrified vehicles, data related to vehicle operation, vehicle electric power consumption, and ambient conditions of the plurality of road segments.

Another aspect of the disclosure may include the cloud-based server operative to execute the data analysis of the vehicle-specific electric energy-related data for the plurality of connected electrified vehicles for the plurality of road segments by determining statistical data for the vehicle-specific electric energy-related data for the plurality of connected electrified vehicles for each of the plurality of road segments.

Another aspect of the disclosure may include a vehicle energy consumption system that includes a target electrified vehicle including an on-vehicle controller and an on-vehicle subsystem that consumes electric power; and a cloud-based server. The on-vehicle controller is in communication with a plurality of on-vehicle sensors and an on-vehicle navigation system, and the on-vehicle controller includes a memory device and a telematics system. The on-vehicle controller includes code that is executable to capture vehicle-specific electric energy-related data for the target electrified vehicle, and communicate the vehicle-specific electric energy-related data for the electrified vehicle to the cloud-based server. The cloud-based server generates a crowd-sourced electrified vehicle energy usage report. The cloud-based server is operative to receive, from the target electrified vehicle, the vehicle-specific electric energy-related data, correlate the vehicle-specific electric energy-related data to a road segment, execute a data analysis of the vehicle-specific electric energy-related data for the road segment in view of the crowd-sourced electrified vehicle energy usage report for the road segment, generate a vehicle-specific crowd-sourced electrified vehicle energy usage report for the target electrified vehicle for the road segment based upon the data analysis, and, communicate the vehicle-specific crowd-sourced electrified vehicle energy usage report.

Another aspect of the disclosure may include the cloud-based server being operative to receive, from a plurality of connected electrified vehicles, vehicle-specific electric energy-related data for the road segment, wherein the vehicle-specific electric energy-related data for the road segment includes data related to vehicle operation, data related to vehicle electric power consumption, and data related to ambient conditions of the road segment for the plurality of the connected electrified vehicles.

Another aspect of the disclosure may include the data related to vehicle operation being vehicle speed, vehicle weight, and vehicle tire pressure, and wherein the data related to vehicle electric power consumption being data related to vehicle system operation that consumes electric power consumption for tractive efforts.

Another aspect of the disclosure may include the data related to ambient conditions of the road segment comprises ambient temperature, time of day, day of week, solar load, wind speed, and wind direction.

Another aspect of the disclosure may include the cloud-based server operative to execute the data analysis of the vehicle-specific electric energy-related data for the road segment for the plurality of connected electrified vehicles by determining statistical data for the vehicle-specific electric energy-related data for the road segment for the plurality of connected electrified vehicles.

Another aspect of the disclosure may include the cloud-based server being operative to: receive, from a plurality of the connected electrified vehicles, vehicle-specific electric energy-related data; correlate the vehicle-specific electric energy-related data to a road segment; execute a data analysis of the vehicle-specific electric energy-related data for the plurality of connected electrified vehicles for the plurality of road segments; and generate the vehicle-specific crowd-sourced electrified vehicle energy usage report for the plurality of road segments based upon the data analysis.

Another aspect of the disclosure may include the cloud-based server operative to receive, from a plurality of the connected electrified vehicles, the vehicle-specific electric energy-related data in the form of data related to vehicle operation, vehicle electric power consumption, and ambient conditions from the plurality of the connected electrified vehicles.

Another aspect of the disclosure may include the cloud-based server operative to execute the data analysis of the vehicle-specific electric energy-related data for the plurality of connected electrified vehicles for the plurality of road segments in the form of statistical data for the vehicle-specific electric energy-related data for the plurality of connected electrified vehicles for each of the plurality of road segments.

Another aspect of the disclosure may include the statistical data for the vehicle-specific electric energy-related data being at least one of a minimum value, a maximum value, a mean value, a median value, a percentile ranking, a normalized minimum value, a normalized maximum value, a normalized mean value, a normalized median value, and a normalized percentile ranking of the vehicle-specific electric energy-related data.

Another aspect of the disclosure may include the on-vehicle controller of the target electrified vehicle operatively controlling the on-vehicle subsystem that consumes electric power based upon the vehicle-specific crowd-sourced electrified vehicle energy usage report.

The above summary is not intended to represent every possible embodiment or every aspect of the present disclosure. The foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the claims.

BRIEF DESCRIPTION OF THE DRAWINGS

One or more embodiments will now be described, by way of example, with reference to the accompanying drawings, in which.

Figure 1:
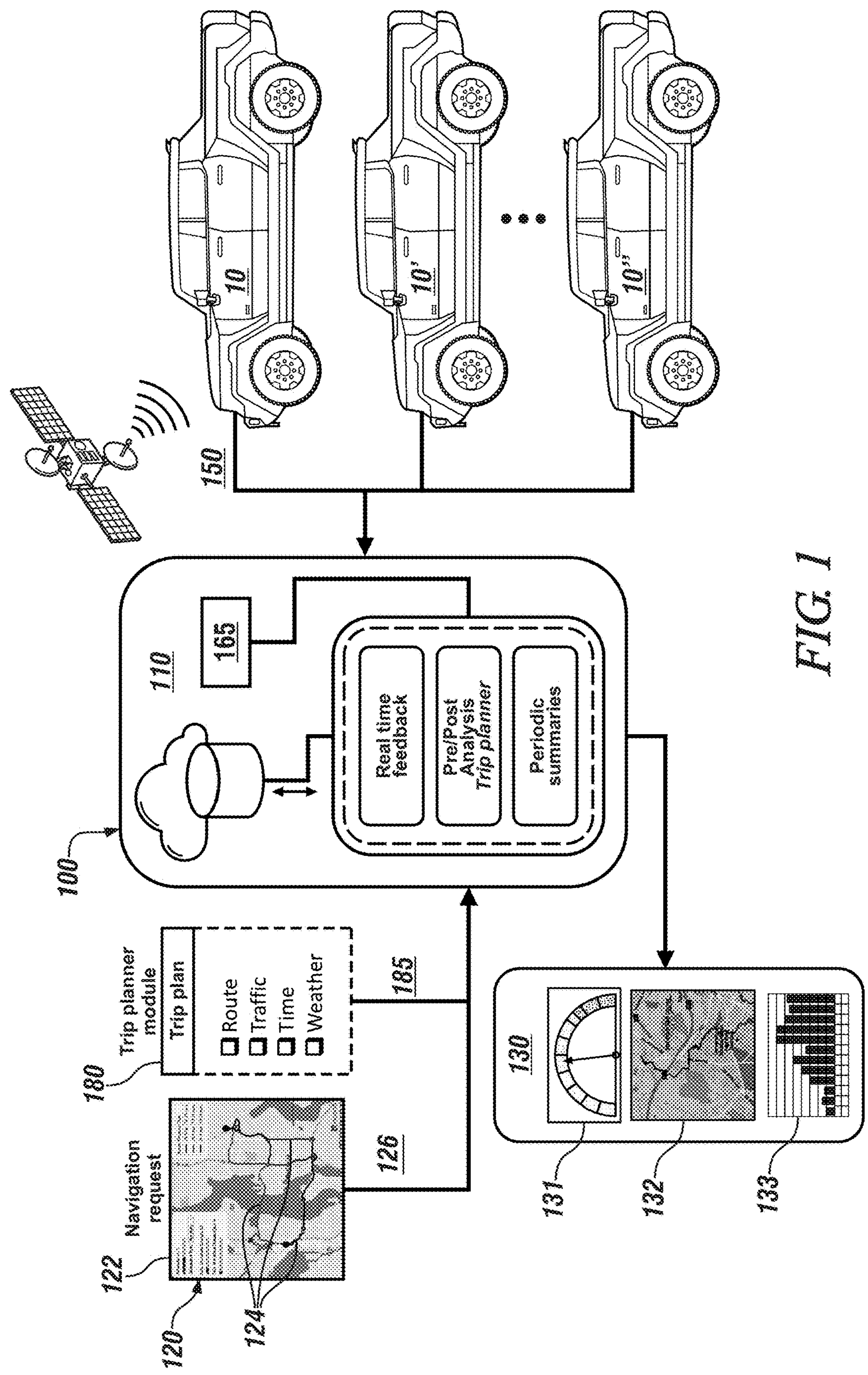
FIG. 1 schematically illustrates elements of a crowd-sourced, cloud-based electrified vehicle energy usage system, in accordance with the disclosure.

The appended drawings are not necessarily to scale, and may present a simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail to avoid unnecessarily obscuring the disclosure. For purposes of convenience and clarity, directional terms such as top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein.

As used herein, the term "system" may refer to one of or a combination of mechanical and electrical actuators, sensors, controllers, application-specific integrated circuits (ASIC), combinatorial logic circuits, software, firmware, and/or other components that are arranged to provide the described functionality. Exemplary embodiments may be described herein in terms of functional and/or logical block components and various processing steps. Such block components may be realized by any number, combination or collection of mechanical and electrical hardware, software, and/or firmware components configured to perform the specified functions. For example, an embodiment may employ various combinations of mechanical components and electrical components, integrated circuit components, memory elements, digital signal processing elements, logic elements, look-up tables, or the like, which may carry out a variety of functions under the control of one or more microprocessors or other control devices. In addition, those skilled in the art will appreciate that the exemplary embodiments may be practiced in conjunction with any number of mechanical and/or electronic systems, and that the vehicle systems described herein are merely exemplary embodiment of possible implementations.

The use of ordinals such as first, second and third does not necessarily imply a ranked sense of order, but may only distinguish between multiple instances of an act or structure.

Figure 2:
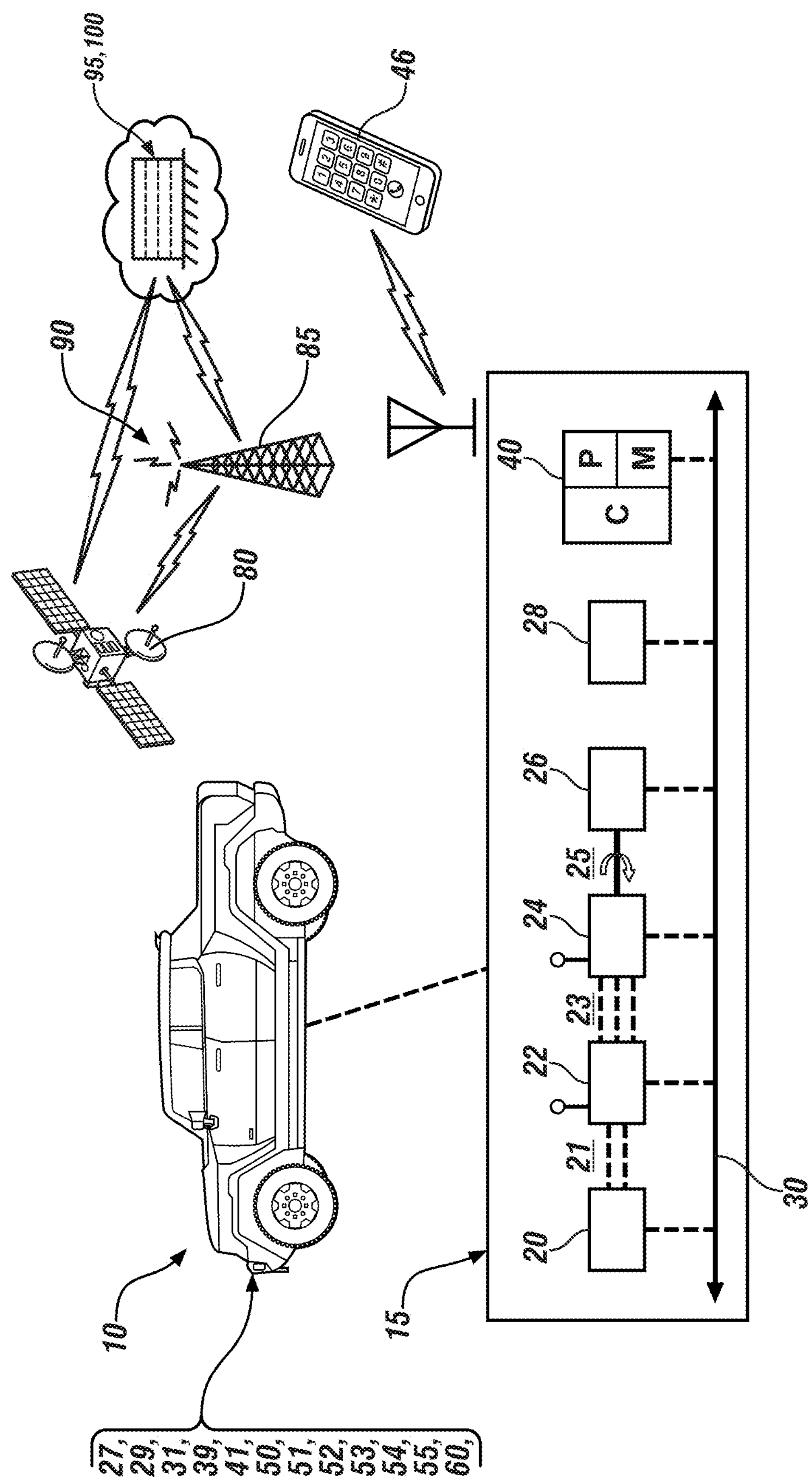
FIG. 2 schematically illustrates a subject vehicle having an electrified (EV) drivetrain, in accordance with the disclosure.

Referring to the drawings, wherein like reference numerals correspond to like or similar components throughout the several Figures, FIGS. 1 and 2 schematically illustrate details related to an electrified vehicle energy usage system 100 that is arranged to regularly, periodically, and/or occasionally receive vehicle-specific electric energy-related data 150 from a plurality of connected electrified vehicles 10, 10', . . . , 10". The vehicle-specific electric energy-related data 150 is correlated to a road segment, and data analysis is executed. One result of the data analysis is the generation of a crowd-sourced electrified vehicle energy usage report for the road segment.

Referring now to FIG. 2, an embodiment of a connected electrified vehicle 10 is schematically illustrated, and includes an electrified vehicle (EV) drivetrain 15 that is arranged to transfer propulsion torque to one of or a plurality of wheels employing electrified drive units (hereafter "drive units") that employ one or multiple electric machines as prime movers. In one embodiment, the EV drivetrain 15 is an electric vehicle drivetrain, wherein all tractive force is generated by electric machine(s) employing electric energy derived from an on-board electric energy storage device, e.g., a battery. In one embodiment, the EV drivetrain 15 is a hybrid-electric vehicle drivetrain, wherein a portion of the tractive force is generated by a combustion engine, and/or a portion of the electric energy is derived from a combustion engine. The EV drivetrain 15 may be capable of single-wheel drive operation, two-wheel drive (2WD) operation, four-wheel drive (4WD) operation, all-wheel drive (AWD) operation, and/or another drivetrain operation within the concepts described herein. The electrified vehicle 10 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The EV drivetrain 15 includes a DC power source such as a rechargeable energy storage unit (battery) 20, a power inverter 22 and a rotary electric machine 24. The rechargeable energy storage unit 20 is electrically connected to the power inverter 22 via a high-voltage DC power bus 21, and the power inverter 22 is connected to the rotary electric machine 24 via a plurality of phased electrical conductors 23. The rotary electric machine 24 is mechanically coupled to a propulsion unit 26 via a rotatable member 25. The rechargeable energy storage unit 20 may be a traction battery pack for generating high-voltage power that may be directed to the propulsion unit 26, via the rotary electric machine 24, and for operating an auxiliary power system 28 in the vehicle 10. The rechargeable energy storage unit 20 may include battery cells of different chemistries. In one example, the power inverter 22 is a three-phase three-wire voltage-source inverter. In some embodiments, the power inverter 22 may be part of a power inverter module of the electrified vehicle 10. To generate tractive power with sufficient vehicle range and speed, the rechargeable energy storage unit 20 in the electrified vehicle 10 may be larger and higher in capacity than a nominal 12-volt starting, lighting, and ignition battery. In such an instance, the EV drivetrain 15 is a high-voltage EV drivetrain 15. Sensors and other monitoring elements (not shown) may be arranged to monitor electrical parameters (e.g., voltage, current) at various locations, and mechanical parameters (e.g., speed) at various other locations.

The rotary electric machine 24 electrically connects to the rechargeable energy storage unit 20 via the high-voltage DC power bus 21 and the power inverter 22. The power inverter 22 is configured with control circuits including power transistors, e.g., IGBTs for transforming high-voltage DC electric power to high-voltage AC electric power and transforming high-voltage AC electric power to high-voltage DC electric power. The power inverter 22 may employ pulsewidth-modulating (PWM) control of the IGBTs to convert stored DC electric power originating in the rechargeable energy storage unit 20 to AC electric power to drive the rotary electric machine 24 to generate torque. Similarly, the power inverter 22 converts mechanical power transferred to the rotary electric machine 24 to DC electric power to generate electric energy that is storable in the rechargeable energy storage unit 20, including as part of a regenerative braking control strategy. The power inverter 22 receives motor control commands and controls inverter states to provide the motor drive and regenerative braking functionality. In one embodiment, a DC/DC electric power converter electrically connects to the high-voltage DC power bus 21 to provide electric power to a low-voltage battery via a low-voltage bus. The low-voltage battery electrically connects to the auxiliary power system 28 to provide low-voltage electric power to low-voltage systems on the vehicle, including, e.g., electric windows, HVAC fans, seats, and other devices. The controller 40 is operatively connected to the power inverter 22 to control transfer of electric power between the rechargeable energy storage unit 20 and a plurality of radially oriented electrically conductive windings of a stator of the rotary electric machine 24. The controller 40 controls the power inverter 22 to sequentially electrically activate electrically conductive windings to exert a rotating magnetic force on a rotor of the rotary electric machine 24 to effect rotation, or to react torque to retard rotation during regenerative operation.

Motors, generators, and other types of electric machines are often embodied as alternating current (AC) torque-generating devices. When the rotary electric machine is energized by a direct current (DC) voltage from a multi-cell battery pack or other DC power supply, a power inverter produces a desired polyphase AC output voltage. For example, a three-phase AC power inverter uses three separate phase inverters each having semiconductor switching components, e.g., IGBTs, MOSFETs, or thyristors. The on/off states of the switching components for a given electrical phase are controlled to produce the desired AC output voltage. The AC output voltage is thereafter supplied to a corresponding phase winding of the rotary electric machine.

The EV drivetrain 15 includes controller C 40 having a processor P and memory M that have been adapted to regulate the operation of various onboard systems and components in the electrified vehicle 10. The controller C 40 is communicatively connected with the power inverter 22 to control the rotary electric machine 24 to control bi-directional transfer of energy between the rechargeable energy storage unit 20 and the rotary electric machine 24 in either a motoring mode or a regenerative mode. The rotary electric machine 24 may operate using a three-phase AC current. The various components of the EV drivetrain 15 may be in communication with the controller C 40 (and each other) via a wireless network 30, which may be a short-range network or a long-range network. Additionally, the various components of the EV drivetrain 15 may include physical wired connections. The wireless network 30 may be a communication BUS, which may be in the form of a serial Controller Area Network (CAN-BUS). The wireless network 30 may incorporate a Bluetooth connection, a Wireless Local Area Network (LAN) which links multiple devices using a wireless distribution method, a Wireless Metropolitan Area Network (MAN) which connects several wireless LANs or a Wireless Wide Area Network (WAN). Other types of connections may be employed.

The electrified vehicle 10 includes an electrically-powered steering system 27 for controlling direction of the steerable wheels.

The electrified vehicle 10 has a climate control system 29 that includes an electrically-powered heating-ventilation-air-conditioning (HVAC) compressor and fan system.

The electrified vehicle 10 may include an electrically-powered stability control system 31 that includes controllable suspension actuators.

Vehicle parameters may be determined from sensor measurements, estimates, and perceptions received by a sensor system in the form of an inertial measurement unit (IMU) 51, which communicates with the stability control system 31. Non-limiting examples of vehicle parameters include longitudinal acceleration, lateral acceleration, yaw rate, steering wheel angle, individual wheel speeds, longitudinal velocity, lateral velocity, tire forces (lateral, normal), vehicle mass, road surface coefficient, road upcoming curvature, road upcoming obstacles.

The electrified vehicle 10 has a telematics device 60, which includes a wireless telematics communication system capable of extra-vehicle communications, including communicating with a communication network system having wireless and wired communication capabilities. The telematics device 60 is capable of extra-vehicle communications that includes short-range ad hoc vehicle-to-vehicle (V2V) communication and/or vehicle-to-everything (V2x) communication, which may include communication with an infrastructure monitor, e.g., a traffic camera and ad hoc vehicle communication. Alternatively, or in addition, the telematics device 60 has a wireless telematics communication system capable of short-range wireless communication to the handheld device 46, e.g., a cell phone, a satellite phone or another telephonic device. In one embodiment the handheld device 46 is loaded with a software application that includes a wireless protocol to communicate with the telematics device 60 to effect identification of the vehicle operator. In one embodiment, the handheld device 46 executes the extra-vehicle communication, including communicating with an off-board server 95 via a communication network 90 including a satellite 80, an antenna 85, and/or another communication mode. Alternatively, or in addition, the telematics device 60 executes the extra-vehicle communication directly by communicating with the off-board server 95 via the communication network 90. In one embodiment, the off-board server 95 is cloud-based.

The electrified vehicle 10 has a navigation system 55 that includes a computer-readable storage device or media (memory) that includes a digitized roadway map, a global navigation satellite system (GNSS) sensor 53, and a human/machine interface (HMI) device for interacting with and operating the navigation system 55. The GNSS sensor 53 generates a set of parameters corresponding to vehicle velocity, geospatial position, and vehicle heading.

The concepts described herein may be employed on various systems that may benefit from information determined from an embodiment of a spatial monitoring system 41 in a manner that is described herein.

The electrified vehicle 10 has a first plurality of sensors 50, which includes sensors that are arranged to dynamically monitor on-vehicle operating conditions, including, e.g., vehicle speed, acceleration, braking, steering angle, yaw rate, tire pressures, vehicle mass, presence of a trailer, battery state of charge (SOC), operator requests, etc. The first plurality of sensors 50 includes the GNSS sensor 53 and the inertial measurement unit (IMU) 51. The IMU 51 is an electronic device that employs one or more of a combination of accelerometers, gyroscopes, and magnetometers that are arranged to measure and report vehicle dynamics parameters such as specific force, angular rate, yaw, and orientation of the vehicle 10.

The electrified vehicle 10 has a second plurality of sensors 52, which includes sensors that are arranged to dynamically monitor ambient environmental conditions including, e.g., elevation, ambient pressure, ambient temperature, humidity (dew point), precipitation, time-of-day, solar load, etc. Alternatively, or in addition, a portion of the ambient environmental conditions may be obtained by connectivity to a proximal weather station or other vehicles employing using V2X communications via the telematics device 60.

The electrified vehicle 10 has a third plurality of sensors 54 associated with the spatial monitoring system 41 that are arranged to provide spatial monitoring proximal to the subject vehicle 10. The spatial monitoring system 41 may be an element of an advanced driver assistance system (ADAS) 39. The third plurality of sensors 54 may include, e.g., a camera, a radar sensor, a lidar sensor, etc. Parameters associated with spatial monitoring include presence and location of other proximal vehicles, presence and location of stationary objects that may serve as obstructions (e.g., rocks, trees, fences, guard rails, etc.), presence and locations of pedestrians, bicyclists, animals, etc.

Referring again to FIG. 1, the electrified vehicle energy usage system 100 includes a cloud-based server 110 that is capable of communicating with a plurality of connected electrified vehicles, e.g., electrified vehicles 10, 10', . . . , 10", and is operative to receive vehicle-specific electric energy-related data 150 therefrom. As employed herein, the terms “cloud”, “cloud-based”, and related terms may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (“SaaS”), Platform as a Service (“PaaS”), Infrastructure as a Service (“IaaS”), and deployment models (e.g., private cloud, community cloud, public cloud, hybrid cloud, etc.).

The cloud-based server 110 includes one or multiple memory devices containing a remote navigation system 120, an analytical engine 140, and a cloud-based crowd-sourced electrified vehicle energy usage report (EV energy usage report) 165 that is road segment-specific. The cloud-based server 110 includes or has access to a multi-layer road map 122 including a multiplicity of road segments 124, and a trip planner module 180. Several of the road segments 124 are indicated on the multi-layer road map 122.

The analytical engine 140 includes algorithmic code for capturing, storing, analyzing, and evaluating the vehicle-specific electric energy-related data 150 that is communicated from the plurality of connected electrified vehicles, e.g., electrified vehicles 10, 10', . . . , 10" to generate the EV energy usage report 165 that is road segment-specific. This is illustrated with reference to FIG. 3. The EV energy usage report 165 may be employed by the trip planner module 180, and by other programs. The trip planner module 180 is described with reference to FIG. 4.

Figure 3:
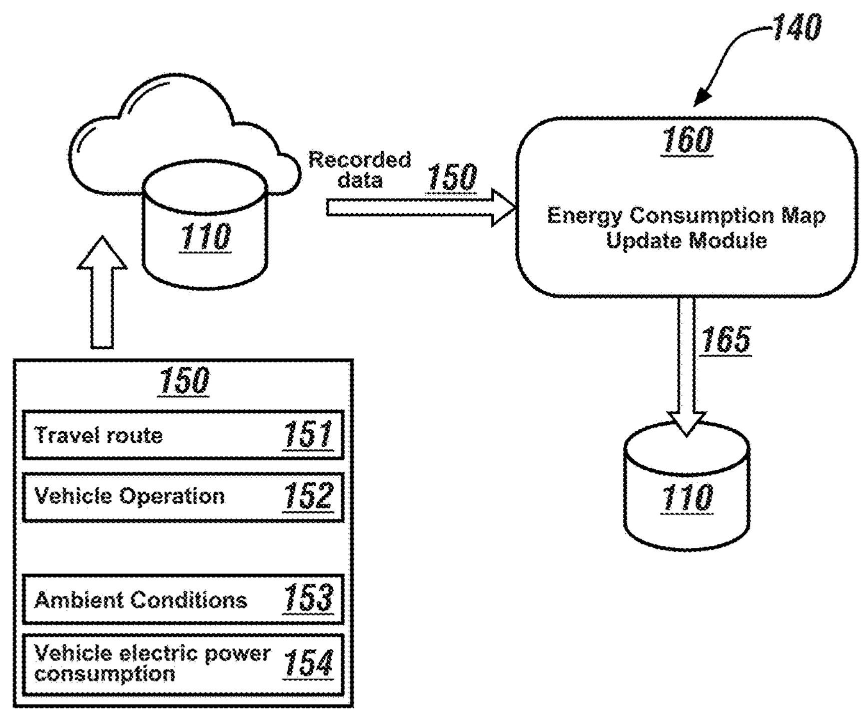
FIG. 3 schematically illustrates elements of an analytical engine for generating and updating a crowd-sourced, cloud-based electrified vehicle energy usage system, in accordance with the disclosure.

FIG. 3 schematically illustrates elements of the analytical engine 140 for generating and updating the EV energy usage report 165 that may be stored on an embodiment of the cloud-based server 110 that is described with reference to FIG. 1.

The vehicle-specific electric energy-related data 150 that is captured, recorded and compiled from the connected electrified vehicles 10, 10', . . . , 10" includes data related to a travel route portion 151, which corresponds to one of the multiplicity of road segments 124 of the multi-layer road map 122. The vehicle-specific electric energy-related data 150 further includes data related to vehicle operation 152 while traversing the travel route portion 151, data related to ambient conditions 153 while traversing the travel route portion 151, and data related to vehicle electric power consumption 154 while traversing the travel route portion 151. This arrangement of the vehicle-specific electric energy-related data 150 is illustrative. The vehicle-specific electric energy-related data 150 may be captured, recorded and compiled within the scope of this disclosure.

The data related to the travel route portion 151 includes, in one embodiment, data related to traffic density and travel speed data, latitude, longitude, elevation, road class (e.g., two-lane, limited access, urban, dirt, etc.), etc. Other data related to a travel route may include data related to topography, terrain, surface conditions, road grade, etc.

The data related to the vehicle operation 152 includes vehicle-specific factors such as vehicle speed, passenger count, vehicle load and mass, HVAC load, tire pressures, presence/absence of faults in the EV drivetrain 15, presence of a trailer, and other factors affecting electric power consumption for tractive effort that is expended while traversing the travel route portion 151.

The data related to ambient conditions 153 includes, in one embodiment, data related to time/day/date data, ambient temperature, precipitation, solar load, wind speed, wind direction, other weather data, road surface conditions, and other factors affecting vehicle traction and vehicle energy consumption while traversing the travel route portion 151.

The data related to vehicle electric power consumption 154 includes data related to electric power consumption for tractive effort, and data related to electric power consumption related to vehicle accessory loads while traversing the travel route portion 151. The electric power consumption related to the vehicle accessory loads includes data related to heating, ventilation, and exterior lighting for the road segment, operation of infotainment systems, and other low-voltage systems without limitation.

The vehicle-specific electric energy-related data 150 is periodically recorded on-vehicle and uploaded to the cloud-based server 110.

An update module 160 receives the vehicle-specific electric energy-related data 150. The update module 160 subjects the vehicle-specific electric energy-related data 150 to filtering and validation to minimize and avoid data corruption. The recorded geographical vehicle coordinates are compared with the multiplicity of road segments 124 of the road map 122 to match the data to one of the road segments 124.

Aggregated data for multiple vehicles, multiple trips with the same vehicle, multiple measurements along the road segment 124 is gathered for analysis, and is stored as the EV energy usage report 165 on the cloud-based server 110 for future access and updating.

The update module 160 of the analytical engine 140 subjects the aggregated data to statistical analysis to determine parameters including, e.g., a minimum value, a maximum value, a mean value, a median value, a percentile ranking, a normalized minimum value, a normalized maximum value, a normalized mean value, a normalized median value, and a normalized percentile ranking of the vehicle-specific electric energy-related data 150.

The statistical analysis further includes compiling and analyzing vehicle-specific electric energy-related data 150 captured from the plurality of connected electrified vehicles 10, 10', . . . , 10" while traversing the multiplicity of road segments 124 to generate and update the EV energy usage report 165.

This includes partitioning the road map into a plurality of road segments. For each road segment, the cloud-based system stores information related to vehicle models, data related to the vehicle operation 152, data related to ambient conditions 153, and data related to vehicle electric power consumption 154. Percentile rankings are determined, including, e.g., 5%, 10%, 25%, 50%, 75%, 90%, 95% percentile rankings for driving data, and best drivers' energy consumption and drivers' data. When new recorded trip data is available, the data uploaded to the cloud-based system and the energy consumption map is updated.

Referring again to FIG. 1, the analytical engine 140 includes algorithmic code to correlate the vehicle-specific electric energy-related data 150 from each of the plurality of connected electrified vehicles to one of the road segments 124, and execute a data analysis of the vehicle-specific electric energy-related data for the plurality of connected electrified vehicles for the road segment 124.

The analytical engine 140 also includes algorithmic code to generate a crowd-sourced electrified vehicle energy usage report 130 for each of the road segments 124 based upon the data analysis. In one embodiment, the crowd-sourced electrified vehicle energy usage report 130 is vehicle-specific, and used to provide feedback to the vehicle operator. In one embodiment, the crowd-sourced electrified vehicle energy usage report 130 is vehicle model-specific.

The crowd-sourced electrified vehicle energy usage report 130 includes real-time feedback 131, one or multiple driver/vehicle-specific summaries 132, and one or multiple periodic summaries 133.

An example of the real-time feedback 131 is depicted as a needle on a dial to indicate energy consumption map data, which may be used to provide a driver with a concise real time feedback about the current energy consumption/energy consumption rate comparing to the driver's past drives, the best drivers' performance and existing statistics. This may be complemented by drive-specific suggestions for vehicle operation under specific or general operating conditions.

Figure 5:
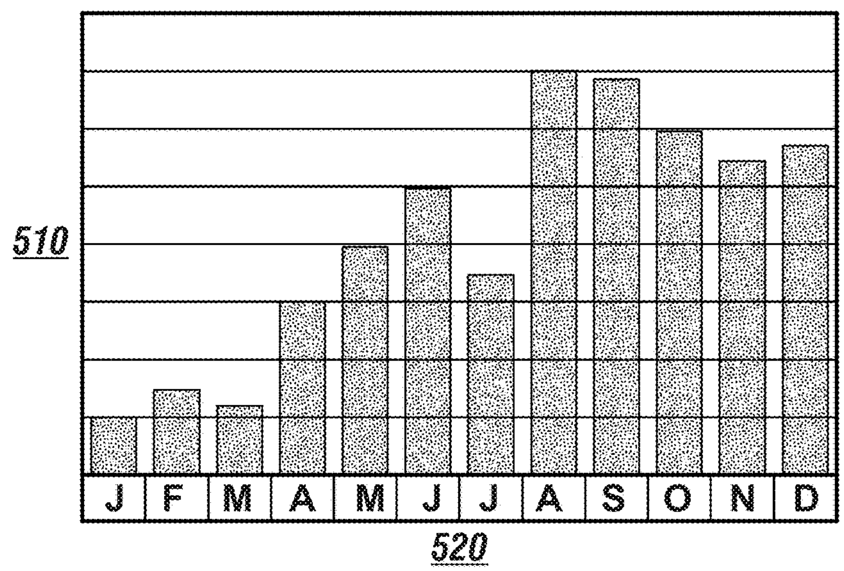
FIG. 5 graphically depicts an example of periodic vehicle energy consumption, in accordance with the disclosure.

An example of the driver/vehicle-specific summary 132 is depicted with reference to FIG. 5.

An example of the periodic summary 133 is depicted as a bar graph that shows energy consumption for time bins, e.g., weekly or monthly. The periodic summary 133 may include energy consumption in the form of periodic driver summaries such as electricity consumption in different road types, comparison to other drivers' consumption, rankings, incentives, and energy saving suggestions for vehicle operation based on driver's past behavior.

The update module 160 described with reference to FIG. 3 updates the EV energy usage report 165 by receiving actual recorded data from the vehicle 10.

Figure 4:
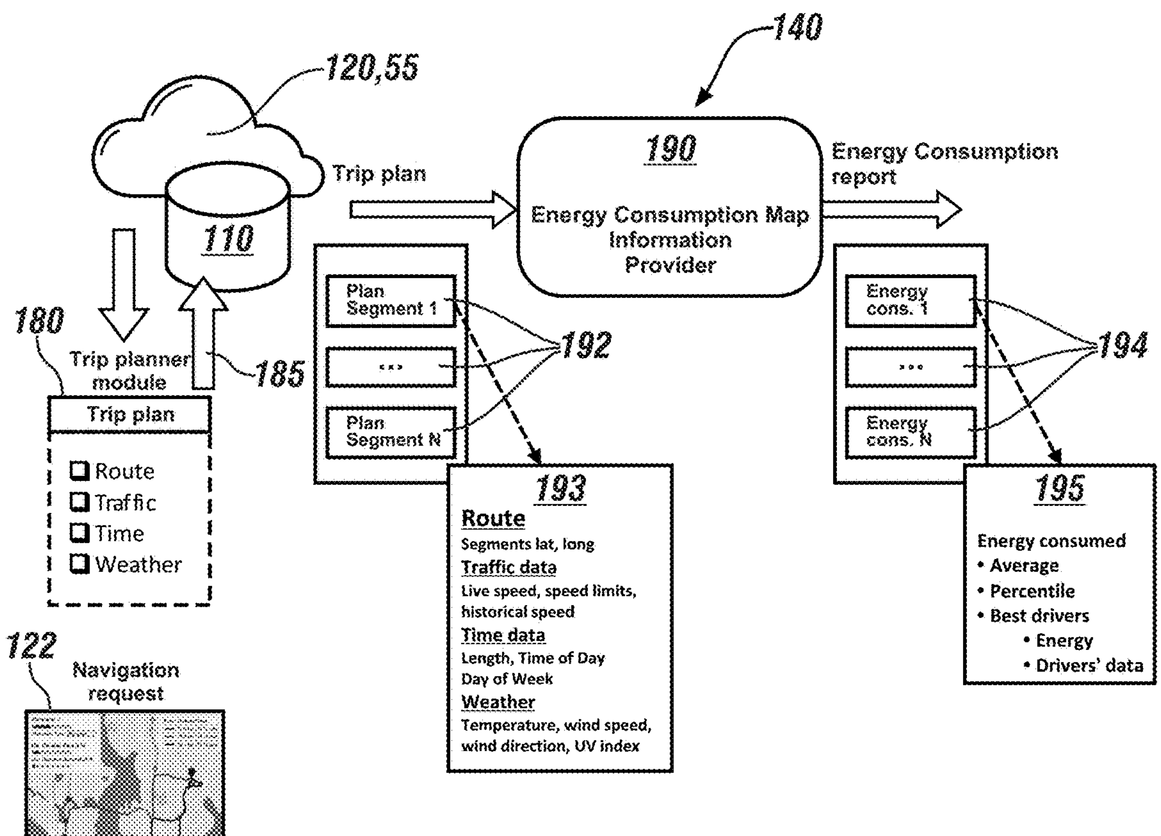
FIG. 4 schematically illustrates information flow related to an energy consumption map information provider, in accordance with the disclosure.

FIG. 4 schematically illustrates information flow related to an energy consumption map information provider 190, which is a cloud-based analytical model that employs an embodiment of the trip planner module 180 and the EV energy usage report 165 to determine energy consumption for road segments of a planned trip, with such information being provided to a vehicle operator. The energy consumption map information provider 190 employs an embodiment of the trip planner module 180 of an embodiment of the electrified vehicle energy usage system 100 described with reference to FIGS. 1 and 2, including employing the multiplicity of road segments 124 of the multi-layer road map 122 and an embodiment of the cloud-based server 110 that is described with reference to FIG. 1.

The trip planner module 180 employs information from the multi-layer road map 122, the remote navigation system 120 and/or the on-board navigation system 55 to generate one or multiple alternative routes for a trip plan 185 to a desired destination. The trip planner module 180 generates the trip plan 185, which is composed of a plurality of the road segments 124 to travel to the desired destination.

The trip planner module 180 retrieves the EV energy usage report 165 from the cloud-based server 110 to obtain relevant data for the travel route 151, data related to vehicle operation 152, data related to ambient conditions 153, and data related to vehicle electric power consumption 154 for each of the plurality of road segments 124 of the trip plan 185. The trip plan 185 is composed of a plurality of plan segments 192 (Plan Segment 1, . . . , Plan Segment N), with each of the plan segments 192 composed with EV energy usage report 165 in the form of the aggregated data 193 for the road segment 124 including the data related to a travel route portion 151, and data related to vehicle operation 152. The aggregated data 193 includes the travel route portion 151, data related to ambient conditions 153 while traversing the travel route portion 151, and data related to vehicle electric power consumption 154 while traversing the travel route portion 151, as described with reference to FIG. 3. Stated differently, the EV energy usage report 165 for the road segment 124 of the travel route 151 includes, in one embodiment, data related to a travel route, traffic density and travel speed data, latitude, longitude, elevation, road class (e.g., two-lane, limited access, urban, dirt, etc.), data related to topography, terrain, surface conditions, road grade, etc., ambient weather conditions, traffic speed, and energy consumption.

The energy consumption map information provider 190 employs the EV energy usage report 165 to determine energy consumption data 195 for each of a plurality of road segments (energy con. Segment 1, . . . energy cons. Segment N) 19. The energy consumed for each of a plurality of road segments (energy con. Segment 1, . . . energy cons. Segment N) may include or be derived from the vehicle-specific electric energy-related data 150 that is described with reference to FIG. 3. The energy consumption data 195 for each of the road segments may be in the form of data related to the vehicle operation, data related to ambient conditions, and data related to vehicle electric power consumption 154, with percentile rankings determined, including, e.g., 5%, 10%, 25%, 50%, 75%, 90%, 95% percentile rankings for driving data, and best drivers' energy consumption and drivers' data. The energy consumption data 195 used to provide real-time comparison with the present operation of the vehicle on the road segment.

FIG. 5 graphically depicts an example of vehicle energy consumption (in kWh) (510) by month (520) to illustrate information that may be available to a driver for purposes of feedback and comparison.

Figure 6:
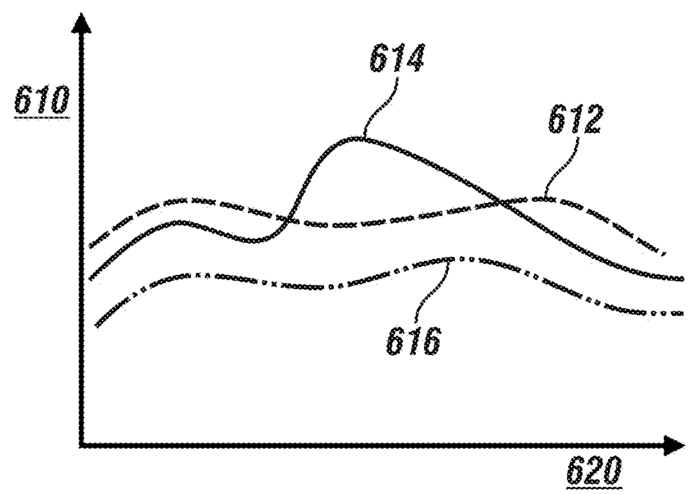
FIG. 6 graphically illustrates vehicle-specific real-time energy consumption for a road segment, in accordance with the disclosure.

FIG. 6 graphically illustrates real-time energy consumption 610 (in Wh/km) in relation to distance 620 (km) to illustrate actual energy consumption 614, average energy consumption 612, and best-case energy consumption 616 for a road segment. This information may be provided in real time to a vehicle operator for purposes of informing the vehicle operator how the present vehicle operation compares to other operators on the road segment.

Figure 7:
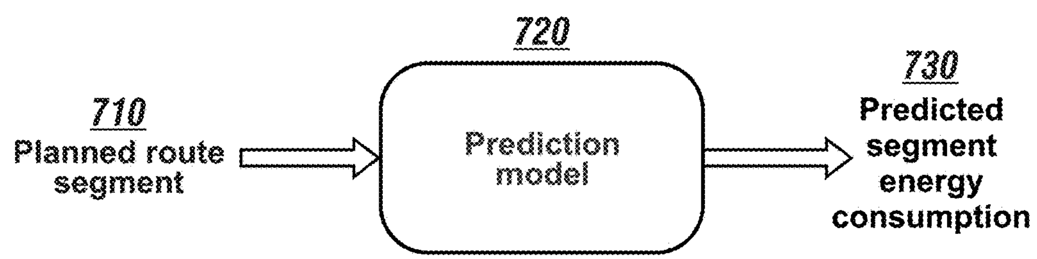
FIG. 7 graphically illustrates a prediction model for predicting energy consumption over a road segment, in accordance with the disclosure.

FIG. 7 graphically illustrates a prediction model 720 for predicting energy consumption 730 over a road segment based at least in part upon input data 710 for the road segment, wherein the input data includes aggregated data for multiple vehicles, multiple trips with the same vehicle, multiple measurements along the road segment in the form of data related to vehicle operation while traversing the road segment, data related to ambient conditions while traversing the road segment, and data related to vehicle electric power consumption while traversing the road segment. The prediction model 720 employs physics, empirical information, and machine learning to predict energy consumption 730 over the road segment. The prediction model 720 may be tailored to be specific to a vehicle, specific to vehicle operating conditions (load, number of passengers, etc.), road conditions, day/time of day/date, etc., weather, etc.

In this manner, in an operating condition in which energy information related to a road segment is not available, is sparse, or has been corrupted, the prediction model 720 may be employed to predict energy consumption for the road segment.

The concepts described herein provide a system and method for providing energy consumption analysis and real-time feedback combining a cloud-based system and energy consumption predictor, including providing and constructing an energy consumption map via cloud-based system. The map data can help in informing individual or fleet drivers how they can adapt their driving style to become more energy efficient. It also includes a map based multi-level feedback to the driver.

The term "controller" and related terms such as microcontroller, control, control unit, processor, etc. refer to one or various combinations of Application Specific Integrated Circuit(s) (ASIC), Field-Programmable Gate Array(s) (FPGA), electronic circuit(s), central processing unit(s), e.g., microprocessor(s) and associated non-transitory memory component(s) in the form of digital data storage mediums including memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffer circuitry and other components, which can be accessed by and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Routines may be executed at regular intervals, for example every 100 microseconds during ongoing operation. Alternatively, routines may be executed in response to occurrence of a triggering event. Communication between controllers, actuators and/or sensors may be accomplished using a direct wired point-topoint link, a networked communication bus link, a wireless link, or another communication link. Communication includes exchanging data signals, including, for example, electrical signals via a conductive medium; electromagnetic signals via air; optical signals via optical waveguides; etc. The data signals may include discrete, analog and/or digitized analog signals representing inputs from sensors, actuator commands, and communication between controllers.

The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium.

The term 'model' refers to a processor-based or processor-executable code and associated calibration that simulates a physical existence of a device or a physical process.

As used herein, the terms 'dynamic', 'dynamically' and related terms describe steps or processes that are executed in real-time and are characterized by monitoring or otherwise determining states of parameters and regularly or periodically updating the states of the parameters during execution of a routine or between iterations of execution of the routine.

The terms "calibration", "calibrated", and related terms refer to a result or a process that correlates a desired parameter and one or multiple perceived or observed parameters for a device or a system. A calibration as described herein may be reduced to a storable parametric table, a plurality of executable equations or another suitable form that may be employed as part of a measurement or control routine.

A parameter is defined as a measurable quantity that represents a physical property of a device or other element that is discernible using one or more sensors and/or a physical model. A parameter can have a discrete value, e.g., either "1" or "0", or can be infinitely variable in value.

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by dedicated-function hardware-based systems that perform the specified functions or acts, or combinations of dedicated-function hardware and computer instructions. These computer program instructions may also be stored in a computer-readable medium that can direct a computer or other programmable data processing apparatus to function in a particular manner, such that the instructions stored in the computer-readable medium produce an article of manufacture including instruction set that implements the function/act specified in the flowchart and/or block diagram block or blocks.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the claims.

What is claimed is:

1. An electrified vehicle energy usage system, comprising:

a cloud-based server, the cloud-based server operative to:

receive vehicle-specific electric energy-related data from a plurality of connected electrified vehicles, wherein the vehicle-specific electric energy-related data from the plurality of connected electrified vehicles includes data related to vehicle operation, vehicle electric power consumption, and ambient conditions from the plurality of connected electrified vehicles;

correlate the vehicle-specific electric energy-related data to a road segment;

execute a data analysis of the vehicle-specific electric energy-related data for the plurality of connected electrified vehicles for the road segment to determine statistical data for the vehicle-specific electric energy-related data for the plurality of connected electrified vehicles for the road segment, wherein the statistical data includes at least one of a minimum value, a maximum value, a mean value, a median value, a percentile ranking, a normalized minimum value, a normalized maximum value, a normalized mean value, a normalized median value, and a normalized percentile ranking for the data related to vehicle operation, vehicle electric power consumption, and ambient conditions from the plurality of the connected electrified vehicles; and generate a crowd-sourced electrified vehicle energy usage report for the road segment based upon the data analysis.

2. The electrified vehicle energy usage system of claim 1, wherein the cloud-based server operative to receive the vehicle-specific electric energy-related data from the plurality of the connected electrified vehicles comprises the cloud-based server operative to receive data related to vehicle operation, vehicle electric power consumption, and ambient conditions from the plurality of the connected electrified vehicles.

3. The electrified vehicle energy usage system of claim 2, wherein the data related to vehicle operation comprises vehicle-specific factors affecting electric power consumption for tractive effort including vehicle speed and vehicle weight.

4. The electrified vehicle energy usage system of claim 2, wherein the data related to vehicle electric power consumption comprises data related to electric power consumption for tractive effort that is expended while traversing the road segment.

5. The electrified vehicle energy usage system of claim 2, wherein the data related to vehicle electric power consumption comprises data related to vehicle accessory loads that consume electric power, including heating, ventilation, and exterior lighting for the road segment.

6. The electrified vehicle energy usage system of claim 2, wherein the data related to ambient conditions comprises ambient temperature, time of day, day of week, solar load, wind speed, wind direction, and road surface conditions for the road segment.

7. The electrified vehicle energy usage system of claim 1, further comprising the cloud-based server operative to:

receive, from a plurality of the connected electrified vehicles, vehicle-specific electric energy-related data for a plurality of road segments;

execute a data analysis of the vehicle-specific electric energy-related data for the plurality of connected electrified vehicles for the plurality of road segments; and generate the crowd-sourced electrified vehicle energy usage report based upon the data analysis for the plurality of road segments.

8. The electrified vehicle energy usage system of claim 7, wherein the cloud-based server operative to receive, from a plurality of the connected electrified vehicles, the vehicle-specific electric energy-related data for the plurality of road segments comprises the cloud-based server operative to receive, from the plurality of the connected electrified vehicles, data related to vehicle operation, vehicle electric power consumption, and ambient conditions of the plurality of road segments.

9. The electrified vehicle energy usage system of claim 7, wherein the cloud-based server operative to execute the data analysis of the vehicle-specific electric energy-related data for the plurality of connected electrified vehicles for the plurality of road segments comprises the cloud-based server operative to determine statistical data for the vehicle-specific electric energy-related data for the plurality of connected electrified vehicles for each of the plurality of road segments.

10. The electrified vehicle energy usage system of claim 1, further comprising the cloud-based server being operative to generate a periodic summary based upon the crowd-sourced electrified vehicle energy usage report based upon the data analysis.

11. The electrified vehicle energy usage system of claim 10, wherein the periodic summary based upon the crowd-sourced electrified vehicle energy usage report based upon the data analysis comprises a periodic driver summary of electric consumption for different road types.

12. The electrified vehicle energy usage system of claim 10, wherein the periodic summary based upon the crowd-sourced electrified vehicle energy usage report based upon the data analysis comprises a periodic driver summary of electric consumption in comparison to other drivers' consumption, rankings, incentives, and energy saving suggestions for vehicle operation based on the driver's past behavior.

13. A vehicle energy consumption system, comprising:

a target electrified vehicle including an on-vehicle controller and an on-vehicle subsystem that consumes electric power; and a cloud-based server;

wherein the on-vehicle controller is in communication with a plurality of on-vehicle sensors and an on-vehicle navigation system;

wherein the on-vehicle controller includes a memory device and a telematics system, the on-vehicle controller including code that is executable to:

capture vehicle-specific electric energy-related data for the target electrified vehicle, wherein the vehicle-specific electric energy-related data includes data related to vehicle operation, vehicle electric power consumption, and ambient conditions, determine a road segment, and communicate the vehicle-specific electric energy-related data for the electrified vehicle to the cloud-based server;

wherein the cloud-based server generates a crowd-sourced electrified vehicle energy usage report, wherein the crowd-sourced electrified vehicle energy usage report includes statistical data associated with vehicle-specific electric energy-related data for a plurality of connected electrified vehicles for the road segment, wherein the statistical data includes at least one of a minimum value, a maximum value, a mean value, a median value, a percentile ranking, a normalized minimum value, a normalized maximum value, a normalized mean value, a normalized median value, and a normalized percentile ranking for the data related to vehicle operation, vehicle electric power consumption, and ambient conditions from the plurality of the connected electrified vehicles;

wherein the cloud-based server is operative to:

receive, from the target electrified vehicle, the vehicle-specific electric energy-related data, correlate the vehicle-specific electric energy-related data to the road segment, execute a data analysis of the vehicle-specific electric energy-related data for the road segment in view of the crowd-sourced electrified vehicle energy usage report for the road segment, generate a vehicle-specific crowd-sourced electrified vehicle energy usage report for the target electrified vehicle for the road segment based upon the data analysis, and communicate the vehicle-specific crowd-sourced electrified vehicle energy usage report.

14. The vehicle energy consumption system for the target electrified vehicle of claim 13, comprising the cloud-based server being operative to receive, from a plurality of connected electrified vehicles, vehicle-specific electric energy-related data for the road segment, wherein the vehicle-specific electric energy-related data for the road segment comprises data related to vehicle operation, data related to vehicle electric power consumption, and data related to ambient conditions of the road segment for the plurality of the connected electrified vehicles.

15. The vehicle energy consumption system for the target electrified vehicle of claim 14, wherein the data related to vehicle operation comprises vehicle speed, vehicle weight, and vehicle tire pressure, and wherein the data related to vehicle electric power consumption comprises data related to vehicle system operation that consumes electric power consumption for tractive efforts.

16. The vehicle energy consumption system for the target electrified vehicle of claim 14, wherein the data related to ambient conditions of the road segment comprises ambient temperature, time of day, day of week, solar load, wind speed, and wind direction.

17. The vehicle energy consumption system for the target electrified vehicle of claim 13, wherein the cloud-based server operative to execute the data analysis of the vehicle-specific electric energy-related data for the road segment comprises the cloud-based server operative to determine statistical data for the vehicle-specific electric energy-related data for the road segment for the plurality of connected electrified vehicles.

18. The vehicle energy consumption system for the target electrified vehicle of claim 13, further comprising the cloud-based server operative to:

receive, from a plurality of the connected electrified vehicles, vehicle-specific electric energy-related data for a plurality of road segments;

correlate the vehicle-specific electric energy-related data for the plurality of connected electrified vehicles to one of the plurality of road segments;

execute a data analysis of the vehicle-specific electric energy-related data for the plurality of connected electrified vehicles for the plurality of road segments; and generate the vehicle-specific crowd-sourced electrified vehicle energy usage report for the plurality of road segments based upon the data analysis.

19. The vehicle energy consumption system for the target electrified vehicle of claim 18, wherein the cloud-based server operative to receive, from a plurality of the connected electrified vehicles, the vehicle-specific electric energy-related data comprises the cloud-based server operative to receive data related to vehicle operation, vehicle electric power consumption, and ambient conditions from the plurality of the connected electrified vehicles.

20. The vehicle energy consumption system for the target electrified vehicle of claim 13, wherein the on-vehicle controller of the target electrified vehicle operatively controls the on-vehicle subsystem that consumes electric power based upon the vehicle-specific crowd-sourced electrified vehicle energy usage report.

* * * * *